March 9, 1926.
C. P. SCHMIDT
1,575,869
RIM PULLER
Filed Dec. 19, 1921
2 Sheets-Sheet 1
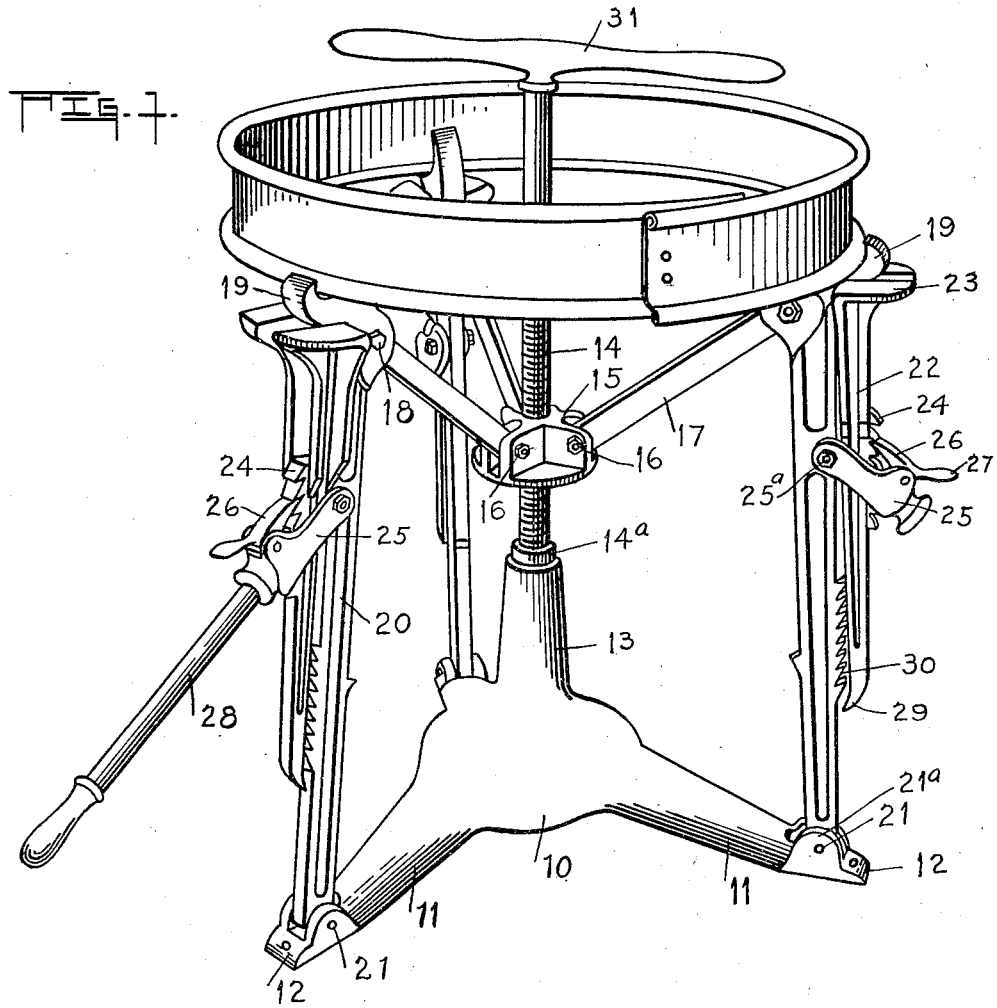
INVENTOR
Christ P. Schmidt
By
Tefft & Tefft
Atty's.

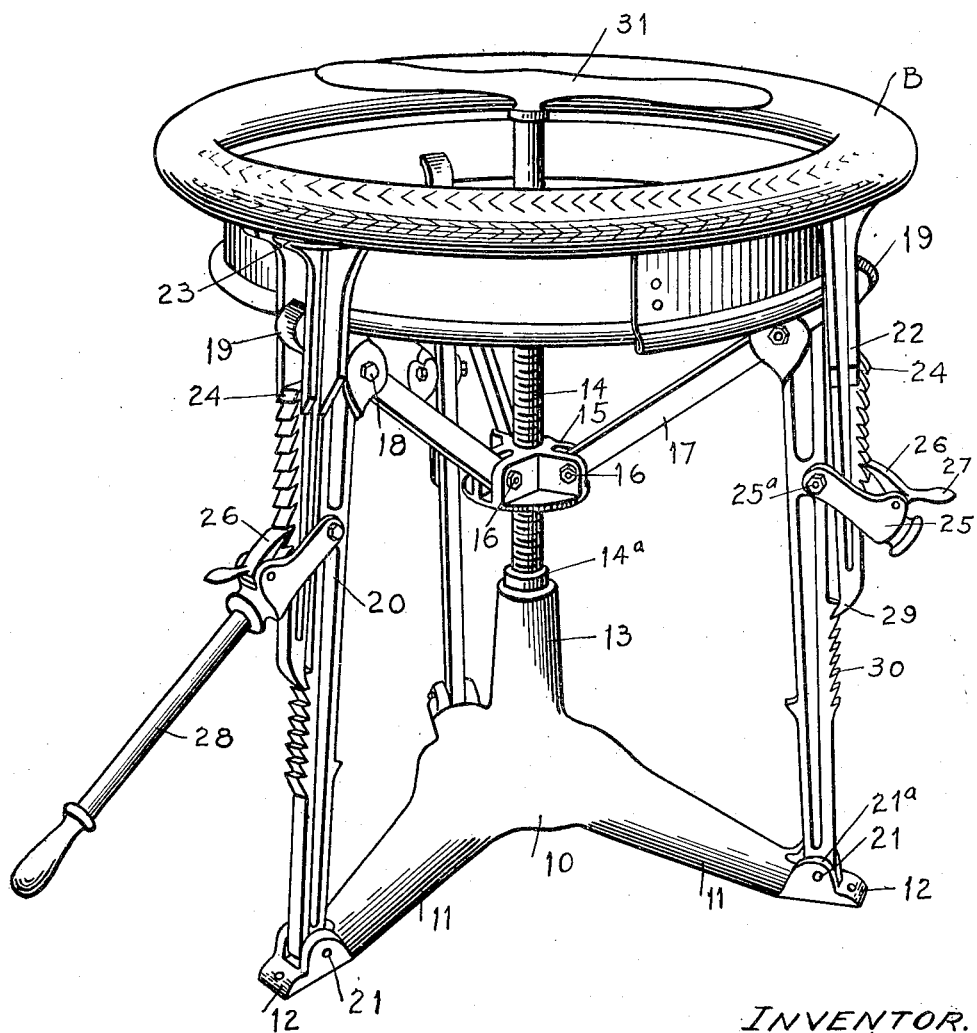

Patented Mar. 9, 1926.

1,575,869

UNITED STATES PATENT OFFICE.

CHRIST P. SCHMIDT, OF HAVANA, ILLINOIS.

RIM PULLER.

Application filed December 19, 1921. Serial No. 523,252.

*To all whom it may concern:*

Be it known that CHRIST P. SCHMIDT, citizen of the United States of America, residing at Havana, in the county of Mason and State of Illinois, has invented certain new and useful Improvements in Rim Pullers, of which the following is a specification.

My invention relates to rim pullers and more particularly to a rim puller which has associated with it an auxiliary means for removing a tire from the rim.

Another object of my invention is in the combination which includes a rim puller and tire remover that are capable of taking care of the various sizes of rims and tires.

Still further object of my invention is in a loosely hinged toggle mechanism for operating upon rims without bending the rims out of shape.

Other objects of my invention will appear in the following specification in connection with the annexed drawings in which:

Figure 1 is a perspective view showing a split rim mounted upon the device after the tire has been removed.

Figure 2 is a perspective view showing a tire partially removed from the rim.

Referring to the specification, 10 shows a base member having the projecting legs 11, said leg portions having the portions 12 at their outer ends having connection with any floor member, thus stabilizing the outfit. An upwardly projecting neck portion 13 provides a seat for a feed screw 14, said screw being seated as at 14ª in the upper end of the neck 13 in such manner that it may be rotated within the neck portion but is not capable of vertical movement. A feed block 15 is internally threaded to engage the screw 14 and due to the movement of said screw, rides either upwardly or downwardly thereon. Loosely hinged as at 16 to the feed block are laterally projecting toggles 17 which, at their outer ends, as at 18, are again loosely hinged to jaws 19, which are cast integral with and also form the upper portion of the arms 20. These upwardly projecting arms 20 have a loosely hinged pivotal connection as at 21 with the outer ends of the leg portions 11. Jack means is provided for forcibly removing a stubborn tire from a rim in the following mechanism.

Plates 22 having the split jaws or rather face portions 23, have the downwardly projecting teeth 24 thereon, said teeth being capable of engagement with pawls 26 on lever holders 25 surrounding the plates 22 and through the arms of which said plates are slidable. The lever holders 25 are pivoted at 25ª to the arms 20. Small levers 27 having connection with the pawls 26 provide means for engaging said pawls with the teeth 24. The lever holders 25 have sockets therein to receive a lever 28. Inasmuch as it is only necessary to use a single jack at a time, but one lever has been provided. The lower ends 29 of the plates 22 project somewhat inwardly and in such manner that they are capable of engagement with the teeth 30 on the outer side of the arms 20. Detachable means is provided at 31 for rotating the feed screw 14.

The operation of the device is as follows:

Although my device is capable of operating upon any type of rim or wheel I have shown it as used in connection with the conventional split rim and will describe it in this connection.

The rim with the deflated tire is placed upon the device with the jaws engaging the lower edge of the rim. Revolution of the member 31 rotates the feed screw 14 thereby forcing the feed block 15 downwardly and contracting the toggle arms 17, with the result, that the rim has its diameter reduced in a corresponding degree. The three loosely hinged connections at 16, 18 and 21 permit the sliding of the jaws about the rim as it is contracted and thereby prevent any possibility of the rim being bent out of its original shape.

It happens very often that the tire shown at B, even when the rim is contracted, due to rust or other reasons, refuses to be easily removed therefrom. I have provided a special jack means, which upon the raising of the lever 28 will force the face 23 against the lower side of the tire and further movement of the lever will increasingly apply pressure thereto. The upward movement of the plate 22 due to the lever action at the same time, forces its inwardly projecting end 29 into engagement with the teeth 30 with the result that an actual jack movement is provided. It may be readily seen that sufficient lever action will remove the tire from the rim. The device is obviously adapted to take care of rims of various sizes by simply adjusting the member 31.

What I claim is:

1. In a rim puller, in combination, a base plate, a feed screw, toggle mechanism including rim clutching jaws, said toggle mechanism having operable connection between the feed screw and base portion whereby said jaw members may be expanded or retracted, and jack members in connection with said toggle mechanism for applying force exteriorly of a rim clutched by the jaw members.

2. In a rim puller, in combination, a base plate, upwardly projecting arms loosely hinged thereon, a feed screw rotatably attached to said base plate, mechanism including loosely hinged toggle arms for expanding or contracting said upwardly projecting arms, and jack mechanism mounted on the arm members including pressure plates slidably mounted on said arm members, pawl and ratchet means for sustaining said plates, and lever mechanism for raising or lowering the plates.

3. In a rim puller, in combination, a base plate, upwardly projecting arms thereon, said arms having rim clutching jaws at their upper ends, a feed screw, toggle mechanism connecting said arms and feed screw, and jack mechanism mounted on said arm members, said jack mechanism including a slidable pressure plate, and means for raising or lowering said plate and for locating it with relation to said arm members.

In testimony whereof I affix my signature.

CHRIST P. SCHMIDT.